(12) United States Patent
Mahfoodh et al.

(10) Patent No.: US 9,681,147 B2
(45) Date of Patent: Jun. 13, 2017

(54) COMPRESSION OF IMAGE ENSEMBLES USING TENSOR DECOMPOSITION

(71) Applicant: Board of Trustees of Michigan State University, East Lansing, MI (US)

(72) Inventors: Abo Talib Mahfoodh, East Lansing, MI (US); Hayder Radha, East Lansing, MI (US)

(73) Assignee: Board of Trustees of Michigan State University, East Lansing, MI (US)

(*) Notice: Subject to any disclaimer, the term of this patent is extended or adjusted under 35 U.S.C. 154(b) by 355 days.

(21) Appl. No.: 14/599,797

(22) Filed: Jan. 19, 2015

(65) Prior Publication Data
US 2015/0296214 A1    Oct. 15, 2015

Related U.S. Application Data

(60) Provisional application No. 61/929,267, filed on Jan. 20, 2014.

(51) Int. Cl.
*H04N 19/44* (2014.01)
*G06F 17/30* (2006.01)
*H04N 19/176* (2014.01)
*H04N 19/46* (2014.01)
*H04N 19/12* (2014.01)
(Continued)

(52) U.S. Cl.
CPC ....... *H04N 19/44* (2014.11); *G06F 17/30247* (2013.01); *H04N 19/12* (2014.11); *H04N 19/176* (2014.11); *H04N 19/46* (2014.11); *H04N 19/90* (2014.11); *H04N 19/647* (2014.11)

(58) Field of Classification Search
USPC .................................................. 382/232–233
See application file for complete search history.

(56) References Cited

U.S. PATENT DOCUMENTS

| 7,379,925 B2* | 5/2008 | Vasilescu | G06K 9/6247 706/20 |
| 7,693,299 B2* | 4/2010 | Vasilescu | G06K 9/00275 348/414.1 |
| 2005/0210036 A1* | 9/2005 | Vasilescu | G06K 9/00335 |

(Continued)

OTHER PUBLICATIONS

A. Cichocki et al., Tensor Decomposition for Signal Processing Applications From Two-way to Multiway Component Analysis, 2014.*

(Continued)

*Primary Examiner* — Ishrat I Sherali
(74) *Attorney, Agent, or Firm* — Harness, Dickey & Pierce, P.L.C.

(57) ABSTRACT

A computer-implemented method is provided for compressing a collection of images. The method includes: receiving image data for an image ensemble composed of a plurality of images; dividing the image data into a plurality of data blocks; decomposing each data block from the plurality of data blocks into a set of rank-one tensors by estimating each rank-one tensor individually, where each rank-one tensor is represented by three one-dimensional vectors; arranging the rank-one tensors for each of the plurality of data blocks into a two-dimensional matrix, where the decomposer is implemented by computer processor; compressing the two-dimensional matrix using a compression operation; and storing the compressed two-dimensional matrix in a non-transitory data store.

21 Claims, 7 Drawing Sheets

(51) Int. Cl.
*H04N 19/90* (2014.01)
*H04N 19/64* (2014.01)

(56) References Cited

U.S. PATENT DOCUMENTS

| | | | |
|---|---|---|---|
| 2006/0143142 A1* | 6/2006 | Vasilescu | G06K 9/6247 706/20 |
| 2008/0247608 A1* | 10/2008 | Vasilescu | G06K 9/00275 382/118 |
| 2016/0232175 A1* | 8/2016 | Zhou | G06T 1/20 |

OTHER PUBLICATIONS

A. Mahfoodh, et al "Tensor Video Coding", Acoustics, Speech and Signal Processing (ICASSP), 2013 IEEE International Conference, (May 2013).
H. Wang et al "Rank-R Approximation of Tensors Using Image-as-Matrix Representation", IEEE Computer Society Conference Computer Vision and Pattern Recognition, (Jun. 2005).
B. Zhou, et al "Compact Representation for Dynamic Texture Video Coding Using Tensor Method", IEEE Transactions on Circuits and Systems for Video Technology, vol. 23, No. (Feb. 2013).
H. Wang et al "Compact Representation of Multidimensional Data Using Tensor Rank-One Decomposition", Proceedings of the 17th International Conference on Pattern Recognition, (Aug. 2004).
Q. Wu, et al., "Hierarchical Tensor Approximation Of Multidimensional Images", IEEE 1-4244-1427-7/07 (2007).

* cited by examiner

COMPRESSION OF IMAGE ENSEMBLES USING TENSOR DECOMPOSITION

CROSS-REFERENCE TO RELATED APPLICATIONS

This application claims the benefit of U.S. Provisional Application No. 61/929,267, filed on Jan. 20, 2014. The entire disclosure of the above application is incorporated herein by reference.

FIELD

The present disclosure relates to compression of image ensembles using tensor decomposition.

BACKGROUND

Image databases represent a core component of many well-established and emerging applications and services including ecommerce and security. For example, image databases of faces, fingerprints, and eye retinas are used extensively for biometric and other security-related applications. Such databases store a vast number of images of the same type, and yet, traditional compression standards are used to compress and store these images without exploiting the correlation that potentially exists among the images within the same database. For example, the ISO/IEC 19794 standard on biometric data interchange format defined JPEG and JPEG2000 as admissible lossy compression methods. A key driver for encoding each image in isolation of other images within the same database is the ability to access and decode any image without the need to access/decode other images. Such requirement eliminates popular video coding standards as viable candidates for coding still-image databases.

In this disclosure, it is proposed to employ a tensor-decomposition framework that can achieve both: (a) random access to any image within a collection of images coded jointly and (b) coding efficiency by exploiting any potential correlation that may exist among the images within the same database. To bring focus to the problem addressed here, an image ensemble is defined as a set of images of the same type (e.g., images of human faces). Thus, the goal is to develop a compression approach for image ensembles while achieving full random access. The proposed tensor-based framework can access any image within an ensemble at different levels of quality (and corresponding scalable bitrates) without the need to reconstruct or access any other image from the same ensemble. This is crucial, not only for storage efficiency, but also to reduce bandwidth across networks for scalable search and retrieval engines. Experimental results show the viability of the proposed tensor-based framework for image-ensemble compression.

This section provides background information related to the present disclosure which is not necessarily prior art.

SUMMARY

This section provides a general summary of the disclosure, and is not a comprehensive disclosure of its full scope or all of its features.

A computer-implemented method is provided for compressing a collection of images. The method includes: receiving image data for an image ensemble composed of a plurality of images; dividing the image data into a plurality of data blocks, where each of the data blocks has three dimensions; decomposing each data block from the plurality of data blocks into a set of rank-one tensors by estimating each rank-one tensor individually, where each rank-one tensor is represented by three one-dimensional vectors; arranging the rank-one tensors for each of the plurality of data blocks into a two-dimensional matrix, where the decomposer is implemented by computer processor; compressing the two-dimensional matrix using a compression operation; and storing the compressed two-dimensional matrix in a non-transitory data store.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
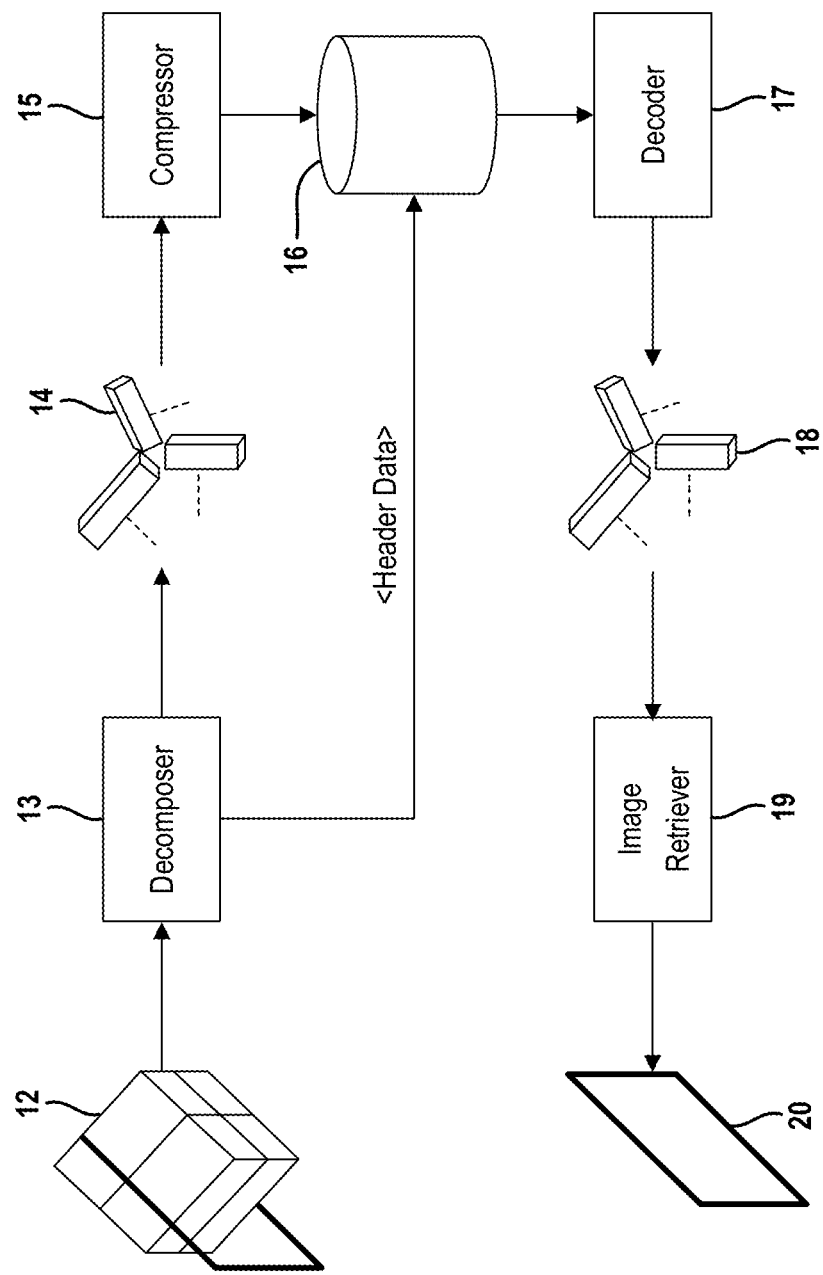
FIG. 1 is a diagram depicting an example architecture for an image-ensemble coding system.

FIG. 1 depicts a high-level architecture for the proposed image-ensemble coding system. An image ensemble 12 serves as an input to the system. In an example embodiment, the image ensemble is composed of a collection of similar still images which are organized into a 3D image-ensemble tensor 12. While reference is made to still images, it is readily understood that the concepts described herein are applicable to other types of image data, such as video. It is also understood that one or more of the still images has been captured by a camera or another type of imaging device and then stored in a database for subsequent processing.

The image data for the image ensemble is received by a decomposer 13. The decomposer 13 is operated to divide the image ensemble 12 into a plurality of 3D tensor-blocks. Each tensor block j is then decomposed by the decomposer 13 into a set of rank-one tensors. This process generates $R_j$ rank-one tensors 14 for the corresponding original tensor-block j. The resulting rank-one tensors 14 are represented by three 1D vectors which are referred to herein as eigenfibers. These eigenfibers, which contain significantly smaller number of elements than the number of voxels in the original 3D image-ensemble, represent a compact representation of the entire 3D tensor data. It is noteworthy that any image (2D slice) within the 3D tensor-ensemble can be reconstructed entirely and independently of other images, directly from the eigenfibers (as explained further below). This compact representation provides random access capability.

To achieve high coding-efficiency, the system can include two more components. First, an optimal rank-allocation process is applied by the decomposer 13 to assign the appropriate number of rank-one tensors to each of the corresponding tensor blocks. This process is analogous to rate-allocation (or rate control) in traditional image/video coding systems. Second, one can further exploit the correlation that exists among the eigenfibers by applying some form of compression as performed by compressor 15. In an example embodiment, the eigenfibers are aligned into a two-dimensional (2D) matrix which is compressed using a 2D image compression method. Finally, the compressed two-dimensional matrix can be stored in a non-transistory data store 16.

Consequently, when access is desired to a single 2D image 20 of the image ensemble, the image 20 can be randomly accessed from the compressed two-dimensional matrix residing in the data store 16. More specifically, the two-dimensional matrix is first decompressed by a decoder 17. The single 2D image 20 is then retrieved by an image retriever 19 from the decompressed two-dimensional matrix. As will be further described below, a low-complexity eigenfiber multiplication may be used by the image retriever 19 to recover the 2D image 20. This is the same order of complexity required when reconstructing any 2D compressed image stored within a database using a traditional approach (e.g., JPEG or JPEG2000).

Image processing techniques, including the system components, described above may be implemented by one or more computer programs executed by one or more computer processors. The computer programs include processor-executable instructions that are stored on a non-transitory tangible computer readable medium (i.e., data store). Likewise, image data and other data may also be stored in a non-transitory tangible computer readable medium. Non-limiting examples of the non-transitory tangible computer readable medium include but are not limited to nonvolatile memory, magnetic storage, and optical storage.

Figure 2:
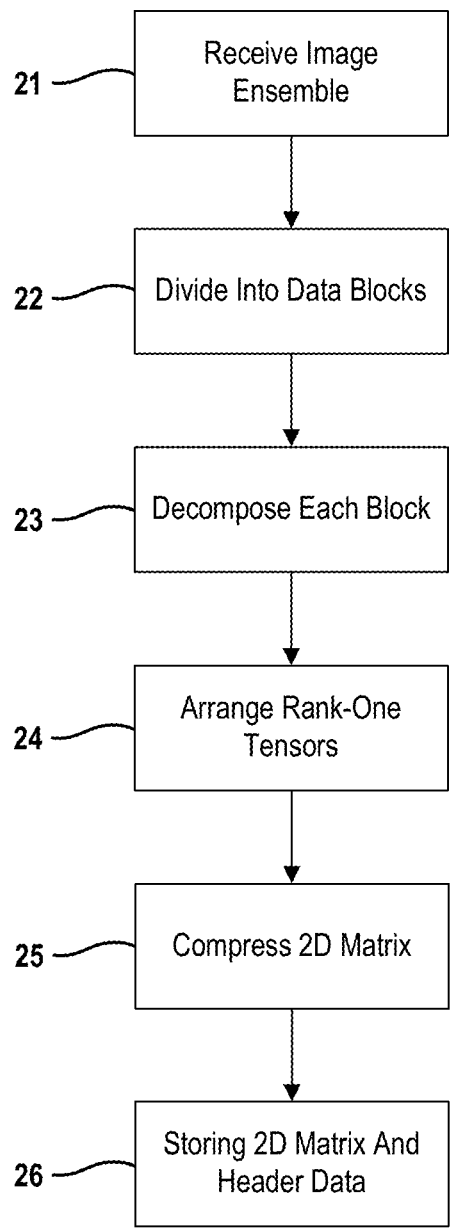
FIG. 2 is a flowchart depicting a proposed method for compressing a collection of images.

FIG. 2 further illustrates an example method for compressing a collection of images. A tensor is a multi-dimensional set of data. For example, a vector is a one dimensional tensor and a matrix is a two dimensional tensor. In this example, the image ensemble is a three dimensional tensor (i.e., $\chi \in \mathbb{R}^{v_1 \times v_2 \times v_3}$). Here a tensor is partitioned into a set of equal size 3D tensor blocks (i.e. $v_1 \times v_2 \times v_3$). In an example embodiment, Progressive Canonical Parallel (PCP) tensor decomposition is employed to factorize each block into a set of rank-one tensors, each of which can be written as an outer product of three vectors as in $$\hat{\chi}_j = \Sigma_{r=1}^{R_j} \lambda_{j,r}(b_{j,r}^{(1)} \circ b_{j,r}^{(2)} \circ b_{j,r}^{(3)}). \qquad (1)$$

where ° is an outer product; j is the block index; $R_j$ is the number of rank-one tensors and $\lambda_{j,r}$ is a normalization value. Other types of decomposition techniques may also be used within the broader aspects of this disclosure.

An alternative Least Square (ALS) algorithm may be used to compute $b_{j,r}^{(d)}$ where d=1,2,3. It minimizes the reconstruction error as in $$b_{j,r}^{*(d)} = \mathrm{argmin}_{b_{j,r}^{(d)}} \left\| \left( X_{(d)} - \sum_{k=0}^{r-1} X'_{(d),k} \right) - b_{j,r}^{(d)} (z_r^{(d)})^T \right\|_F \qquad (2)$$

where $z_r^{(d)} = b_{j,r}^{(d_1)} \otimes b_{j,r}^{(d_2)}$, $\otimes$ is the Kronecker product, $d \in \{1,2,3\}$, $d_1 \in \{1,2,3\}-\{d\}$, and $d_2 \in \{1,2,3\}-\{d,d_1\}$. $X_{(d)}$ is a matrix that results from unfolding the block j with respect to the $d^{th}$ dimension. For example, $X_{(1)} \in \mathbb{R}^{v_1 \times (v_2 v_3)}$ is a matrix that results from unfolding the block j with respect to the first dimension (i.e. $v_1$) [1]. $X'_{(d),k}$ is the $k^{th}$ rank-one tensor unfolded over dimension d, and $k \in \{1,2,\ldots,R\}$. $X'_{(d),0}=0, X'_{(d),k}=\lambda_k b_k^{(d)}(z_k^{(d)})^T$. For a given rank parameter $R_j$, the ALS approach solves $b_r^{(1)}$ by fixing $b_r^{(2)}$ and $b_r^{(3)}$; and similarly for $b_r^{(2)}$ and $b_r^{(3)}$. Other types of estimation techniques also fall within the broader aspects of this disclosure.

Figure 3A:
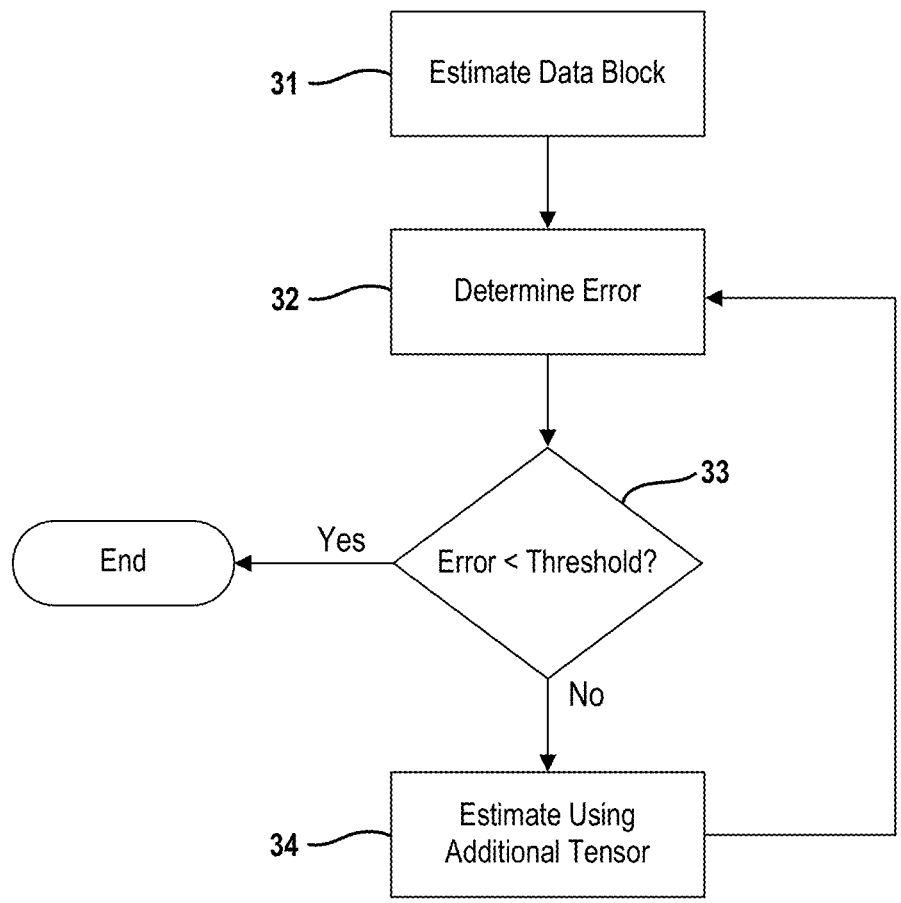
FIG. 3A is a flowchart depicting an example method for estimating rank-one tensors individually.

Unlike traditional CP, the proposed PCP decomposition has an extra loop to solve for each rank one tensor progressively. With reference to FIG. 3A, PCP begins at 31 by estimating a given data block with a rank-one tensor. Next, an error is determined at 32 between the given data block and a reconstruction of the given data block from the rank-one tensor. The error is compared to a threshold at 33. If the error is higher than a threshold, another rank-one tensor is added at 34 to represent the given data block. These steps are repeated until the error is below the threshold or some maximum allowable number of tensors is reached. Thus, PCP estimates each rank-one tensor individually; whereas, traditional CP estimates all rank-one tensors at once.

Figure 3B:
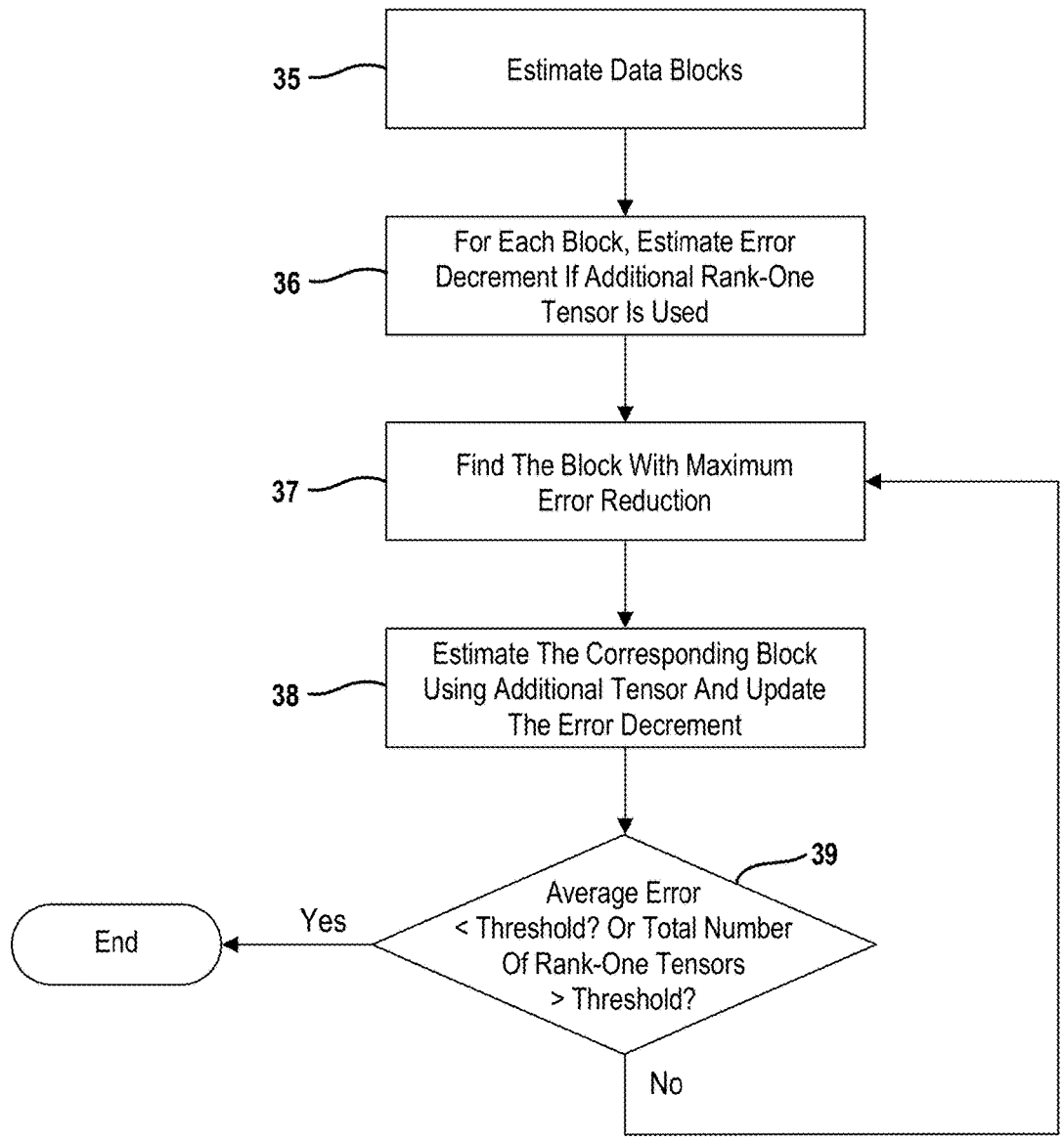
FIG. 3B is a flowchart depicting an alternative method for estimating rank-one tensors individually.

An alternative approach for estimating rank-one tensors individually is shown in FIG. 3B. This approach begins by estimating each data block at 35 with a rank-one tensor. For each data block, an error is estimated at 36 between a given data block and an estimate of the given data block using an additional rank-one tensor. Next, the data block having the largest error reduction is identified at 37. The corresponding data block is estimated at 38 using an additional tensor and the error reduction is updated. These steps are repeated as indicated at 39 until the average error is below a threshold or some maximum allowable number of tensors is reached.

This example rank-distortion optimization algorithm is further described below. For a given tensor with N 3D blocks, the goal is to find the global optimum R, where R is a vector of dimension N. Each entry of $R=(R_1,R_2,\ldots,R_N)$ corresponds to the number of rank-one tensors which are used to reconstruct a 3D-block of the tensor.

The rank-distortion optimization problem is formulated to find the global optimum R as in $$\min_R \left( \sum_{j=1}^{N} R_j \right) \text{ s.t.} \qquad (3)$$

$$\frac{1}{N} \sum_{j=1}^{N} \left\| \chi_j - \sum_{i=1}^{R_j} \lambda_{j,i}(b_{j,i}^{(1)} \circ b_{j,i}^{(2)} \circ b_{j,i}^{(3)}) \right\|_F \leq \epsilon_{max}$$

$$\sum_{j=1}^{N} R_j < \left( \frac{1}{\gamma} \sum_{j=1}^{N} \frac{v_1 v_2 v_3}{v_1+v_2+v_3} \right) \triangleq R_{max}$$

where $\in_{max}$ is the overall acceptable average error. The second inequality in (3) captures an upper bound for the total number of eigenfibers that can be used. $\gamma$ is a regularization parameter where $\gamma>1$. Assuming that we use the same precision for the original tensor entries and for the elements of the PCP decomposition (e.g., eight bits/element), using the eigenfibers instead of the original block will result in the compaction ratio equal to $v_1v_2v_3/R_j(v_1+v_2+v_3)$. The second inequality in (3) came from lower bounding the compaction ratio by $\gamma$. Note that $R_{max}$ can be simplified $((v_1v_2v_3)N)/(\gamma(v_1+v_2+v_3))$.

A solution to this optimization problem can be found by searching for the optimum $R_j$ which satisfies the constraints. A greedy algorithm is proposed to solve (3). The algorithm starts initially using $R=\vec{1}$. This initialization is along with the fact that each 3D tensor block should be represented at least with one rank-one tensor. Define $D_j$ as block j error decrement, corresponding to $R_j$ increment by one (i.e. $D_j=\in_{j,R_j}-\in_{j,R_j+1}$). Initially $D_j=\in_{j,1}-\in_{j,2}$ for j=1 . . . N. Iteratively find block j that has the maximum $D_j$ and increase its corresponding $R_j$ by one. This greedy choice provides the largest possible error reduction. After increasing $R_j$, the inequalities are checked to make sure they are satisfied. The details of the algorithm are outlined below.

Data: A set of 3D blocks of a tensor (i.e. $X_j$, j=1, . . . N .), and $\gamma$.
Result: A set of eigenfibers to represent the input tensor.
Initialization:

$$R=\vec{1}$$

Find $\lambda_{j,r}b_{j,r}^{(1)}$, $b_{j,r}^{(2)}$, and $b_{j,r}^{(3)}$ for r=1,2 and j=1 . . . N (2).

$$\in_{j,r}=\|\chi_j-\Sigma_{i=1}^{r}\lambda_{j,i}(b_{j,i}^{(1)}\circ b_{j,i}^{(2)}\circ b_{j,i}^{(3)})\|_F$$

for r=1,2 and j=1 . . . N.

$$D_j=\in_{j,1}-\in_{j,2}. \text{ for } j=1...N$$

While first inequality in (3) is not satisfied and the second inequality in (3) is satisfied:

```
do
| -    j = argmax_j D_j
| -    r = R_j + 1
| -    Find λ_{j,r}, b_{j,r}^(1), b_{j,r}^(2), and b_{j,r}^(3) from (2) and store them in matrices
       B^(1), B^(2), and B^(3).
| -    Find λ_{j,r+1}, b_{j,r+1}^(1), b_{j,r+1}^(2), and b_{j,r+1}^(3) from (2).
| -    ∈_{j,r} = ‖ χ_j - Σ_{i=1}^{r} λ_{j,i}(b_{j,i}^(1) ∘ b_{j,i}^(2) ∘ b_{j,i}^(3)) ‖_F
| -    ∈_{j,r+1} = ‖ χ_j - Σ_{i=1}^{r+1} λ_{j,i}(b_{j,i}^(1) ∘ b_{j,i}^(2) ∘ b_{j,i}^(3)) ‖_F
| -    D_j = ∈_{j,r+1} - ∈_{j,r}
| -    R_j = r
end
```

Other types of optimization algorithms also fall within the scope of this disclosure.

Returning to FIG. 2, the eigenfibers for each data block are arranged at 24 into a two-dimensional matrix. In the example embodiment, the decomposed eigenfibers $b_{j,r}^{(d)}$ are arranged into matrix $B^{(d)}$, where $B^{(d)} \in \mathbb{R}^{v_d \times \Sigma_{j=1}^{N} R_j}$, N is number of blocks, and d=1,2. The vectors $\lambda_{j,r}(b_{j,r}^{(3)})$ are arranged in matrix $B^{(3)}$. This will eliminate the need for coding $\lambda_{j,r}$ parameters separately.

Figure 4:
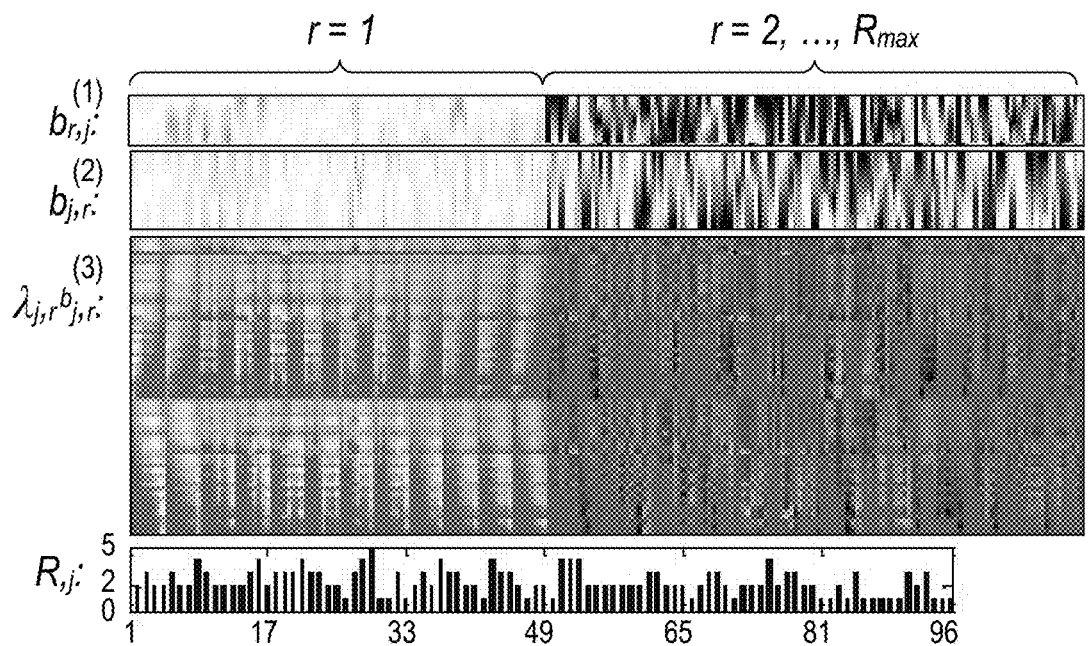
FIG. 4 is an illustration of an eigenfiber arrangement and rank values for 96 blocks of an image ensemble.

FIG. 4 shows an example arrangement of eigenfibers obtained from decomposing such an image ensemble. Consider an image ensembles of size 128×192×64 divided into 16×16>64 3D blocks, which results in 96 tensor blocks. All eigenfiber values are mapped from their normalized [−1, +1] range onto the traditional [0,255] pixel values.

In the example arrangement, the eigenfibers $b_{j,r}^{(1)}$ are put at the top of the 2D image; each fiber is of height 16. Next, the second eigenfibers $b_{j,r}^{(2)}$, also with height 16, are placed below $b_{j,r}^{(1)}$. These two groups of eigenfibers capture the 16×16 spatial information of the tensor-blocks. Meanwhile, the third eigenfibers $b_{j,r}^{(3)}$ with height 64 are placed below. These later eigenfibers capture the temporal information of the 3D tensor-blocks.

More importantly, the eigenfibers associated with the first rank-one tensors (i.e., for r=1) are separated horizontally from the remainder of all other eigenfibers with higher rank index (i.e. for r>1). This separation is analogous to differentiating between "DC" and "AC" coefficients in traditional image and video coding. For higher rank indices, r>1, the eigenfibers may be placed according to the blocks they belong to in a raster-scan order although other horizontal arrangements for eigenfibers with r>1 are also contemplated. For example, one can group eigenfibers with r=2, followed by ones with r=3, and so on.

As shown in FIG. 4, the temporal eigenfibers $b_{j,r}^{(3)}$ are multiplied with the corresponding parameters $\lambda_{j,r}$. There are two benefits for absorbing these parameters onto the eigenfibers. First, the need for coding these parameters separately is eliminated. Second, this multiplication process improves the correlation among the eigenfibers within the 2D image.

The two-dimensional matrix is then compressed at 25 using a compression operation. The decomposed vectors can be coded by any 2D image compression method. In an example embodiment, the compression method is JPEG 2000 operation. From experience, it was found that the lossy mode with compression ratio equal to 2 yields good compression without major losses in the final image quality.

Lastly, the compressed two-dimensional matrix is stored at 26 for subsequent retrieval. The matrix is stored along with a header, where the header includes size of the image ensemble, size of each data block, and the R vector. In one embodiment, the header information can be entropy coded in a lossless manner. This information is required in decoding and retrieving an image.

Within the framework set forth above, a given image from the image ensemble can be randomly accessed from the stored two-dimensional matrix. The eigenfibers $b_{j,r}^{(1)}$ and $b_{j,r}^{(2)}$ can be considered as the basis dictionary for the image ensembles while each value in $b_{j,r}^{(3)}$ is a coefficient. A single image reconstruction requires the basis from $B_{j,r}^{(1)}$ and $B_{j,r}^{(2)}$ and corresponding coefficients (i.e. single row) from $B_{j,r}^{(3)}$. Note that row i would reconstruct $i^{th}$ image in the ensembles. In the example embodiment, an image i of the ensemble can be decoded as in $$\text{IMAGE}_{i,j}=\Sigma_{r=1}^{R_j}(B_{j,r}^{(1)}\circ B_{j,r}^{(2)})B_{i,j,r}^{(3)} \qquad (4)$$

where j is the block's index, $B_{j,r}^{(d)}$, d=1,2 is a vector $B_{i,j,r}^{(3)}$, is a single value from row i of matrix $B^{(3)}$. The column index (k) is calculated based on the value of j and r as in $$\text{Column Index} = \begin{cases} j & \text{if } r = 1 \\ N + \sum_{z=1}^{j-1} R_z + r - 1 & \text{if } r > 1 \end{cases}$$

For demonstration purposes, the proposed method was applied to the Yale Face Database B. This database has images of 38 persons. Each of them has 64 images of size 192×168. These images vary in expression and illumination condition. After stacking the images on top of each other, there is a 3D tensor of size 192×168×2432. The resulting tensor is decomposed using PCP and the eigenfibers are arranged in 2D matrices. The result is then compressed by JPEG2000. Within the context of the proposed image-ensemble tensor based compression, a comparison is made between the proposed tensor decomposition approach and existing still-image compression standards used in image databases:

1. Block-wise PCP-decomposition. The block size is 16×21×64 and the value of $\gamma$ is changed to control the final storage size.
2. Block-wise CP-decomposition. The block size is the same as in method (1) and the value of $\gamma$ is changed to compare the results for different compaction ratios. Here, we used the same structure as in FIG. 1 except the decomposition method is replaced with CP and JPEG2000 lossless mode is used since small changes in the CP decomposed vectors can lead to large error in reconstruction.
3. Storing each image separately using JPEG2000 standard. The MATLAB implementation is used.

Figure 5:
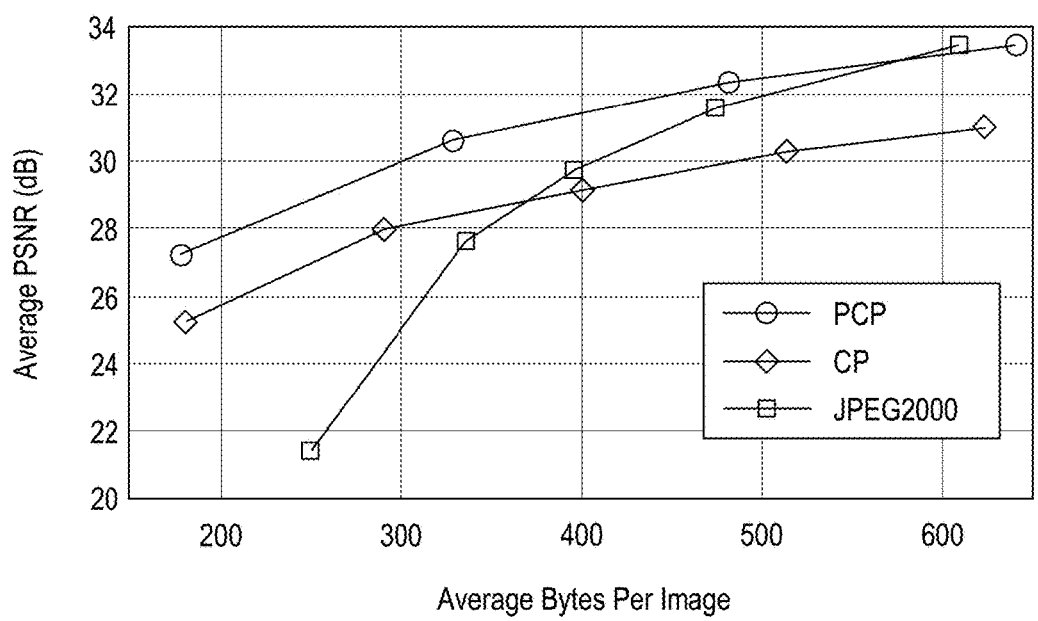
FIG. 5 is a graph showing the reconstruction PSNR averaged over 38 persons versus the average per image required space. For testing and simulation, the proposed method was applied to the Yale Face Database B; the database has images of 38 persons, each of them has 64 images.
Figure 6A:
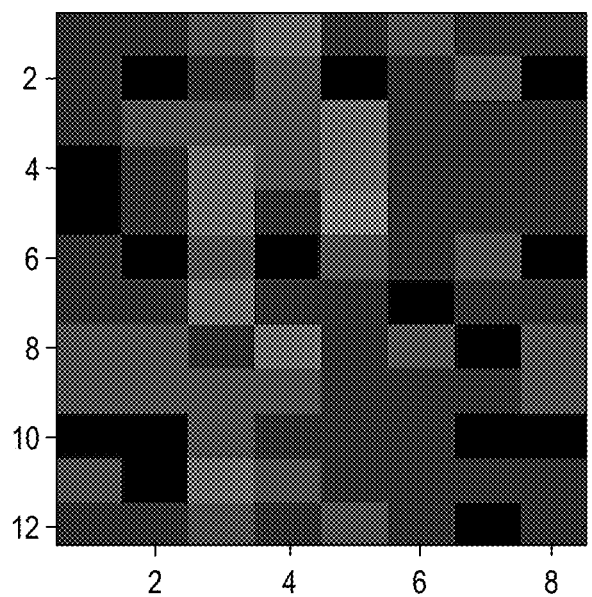
FIGS. 6A and 6B are graphs showing PCP R values for the blocks on an image encoded at 288 bytes and 979 bytes, respectively.
Figure 6B:
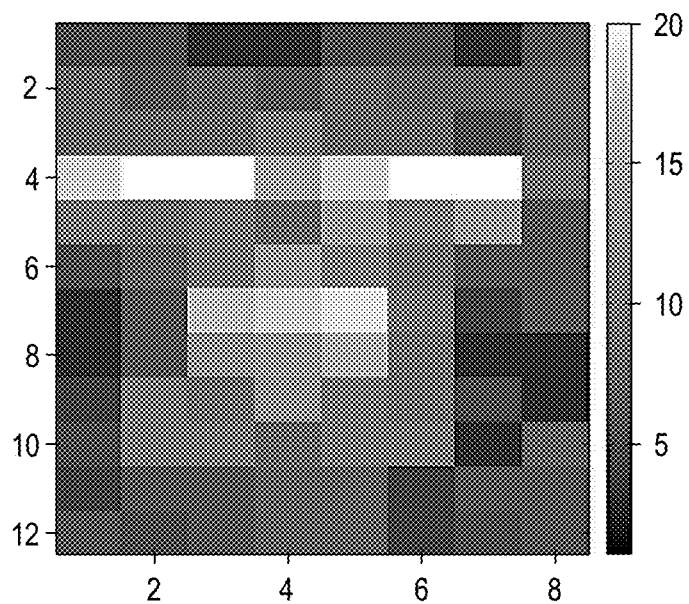

FIG. 5 shows the reconstruction PSNR averaged over 38 persons versus the per image required space (in Bytes) averaged over all the 64 images of 38 persons. Over a wide-range of bitrates, PCP clearly outperforms the other methods. FIGS. 6A and 6B shows the PCP R values for the blocks of an image encoded at two different bit rates.

Figure 7A:
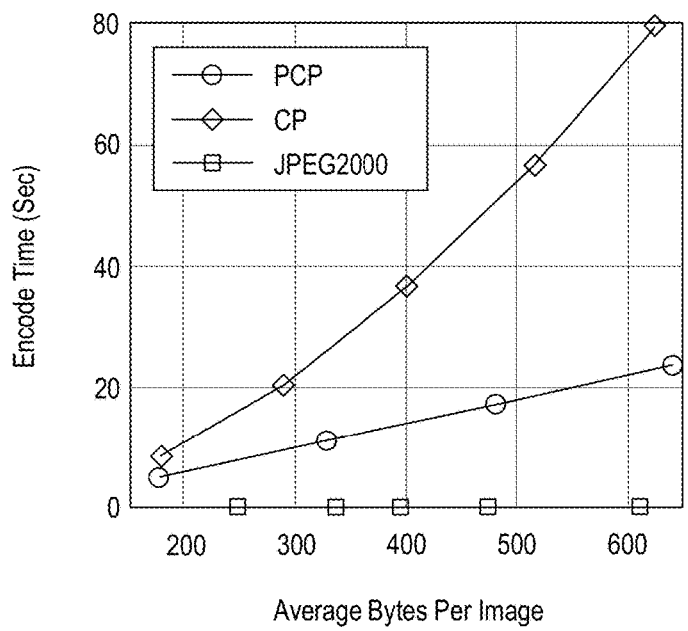
FIGS. 7A and 7B are graphs showing the average encoding and decoding time, respectively, of 38 persons' face images.
Figure 7B:
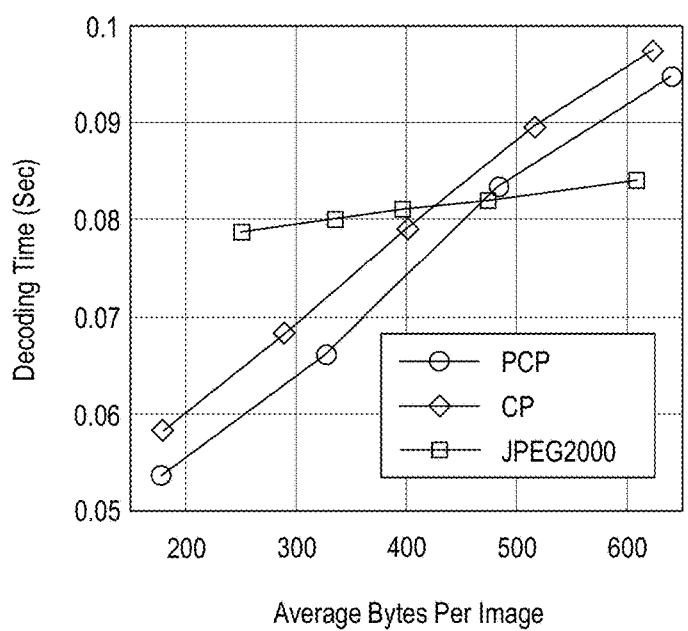

Based on the progressive nature of PCP, its time complexity is linear as a function of the number of rank-one tensors. CP factorization (i.e., the encoding side) has a quadratic complexity as a function of R. Either case (PCP or CP), the decoding complexity is on the same order as a traditional JPEG2000 decoding. FIGS. 7A and 7B show the time complexity for the different approaches, where the decomposition methods are evaluated at a desktop computer with 12 GB of memory and an Intel Core i7 2600 CPU (8 MB Cache, 3.4 GHz).

In conclusion, these simulations confirm the conjecture that one can achieve highly-efficient progressive coding of image ensembles while maintaining low-complexity random access to any desired image when employing tensor-based decomposition. The proposed system that is based on PCP factorization, optimal rank-allocation, and eigenfibers coding clearly shows its viability as an image-ensemble compression framework.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for compressing a collection of images, comprising:
   receiving, by a decomposer, image data for an image ensemble composed of a plurality of images;
   dividing, by the decomposer, the image data into a plurality of data blocks, each of the data blocks having three dimensions;
   decomposing, by the decomposer, each data block from the plurality of data blocks into a set of rank-one tensors by estimating each rank-one tensor individually, where each rank-one tensor is represented by three one-dimensional vectors;

arranging, by the decomposer, the rank-one tensors for each of the plurality of data blocks into a two-dimensional matrix, where the decomposer is implemented by computer processor;

compressing the two-dimensional matrix using a compression operation; and storing the compressed two-dimensional matrix in a non-transitory data store.

2. The method of claim 1 further comprises decomposing each data block into a rank-one tensor represented as an outerproduct of three vectors as follows $$\hat{\chi}_j = \Sigma_{r=1}^{Rj} \lambda_{j,r} (b_{j,r}^{(1)} \circ b_{j,r}^{(2)} \circ b_{j,r}^{(3)})$$

where $\circ$ is an outer product; j is the block index; $R_j$ is the number of rank-one tensors and $\lambda_{j,r}$ is a normalization value.

3. The method of claim 2 wherein decomposing each data block further comprises
  (a) representing a given data block with a given rank-one tensor;
  (b) determining an error between the given data block and a reconstruction of the given data block from the rank-one tensor;
  (c) adding another rank-one sensor to represent the given data block when the error is below a threshold; and
  (d) repeating steps (b) and (c) until the error is below the threshold.

4. The method of claim 2 wherein decomposing each data block further comprises
  (a) representing each data block with a rank-one tensor;
  (b) for each block, estimate error reduction when an additional rank-one tensor is used;
  (c) find a given data block with maximum error reduction;
  (d) estimate a corresponding data block for the given data block using an additional tensor; and
  (e) repeating steps (c) and (d) until an average error for the data blocks is below a threshold or a total number of rank-one tensors is larger than a maximum allowable value.

5. The method of claim 2 further comprises computing $b_{j,r}^{(d)}$ using an alternative least square method.

6. The method of claim 3 wherein arranging the rank-one tensors by putting $b_{j,r}^{(1)}$ at the top of the matrix, putting $b_{j,r}^{(3)}$ at the bottom of the matrix, and placing $b_{j,r}^{(2)}$ below $b_{j,r}^{(1)}$ in the matrix and above $b_{j,r}^{(3)}$ in the matrix.

7. The method of claim 5 wherein arranging the rank-one tensors further comprises separating rank-one tensors with a rank index of one from the remainder of the rank-one tensors and placing the rank-one tensors with a rank index of one on the left of the matrix.

8. The method of claim 6 wherein arranging the rank-one tensor further comprises placing the rank-one tensor with a rank greater than one according to the blocks they belong to in a raster-scan order.

9. The method of claim 1 further comprises compressing the two-dimensional matrix using JPEG 2000 operation.

10. The method of claim 1 further comprises storing the compressed twodimensional matrix with a header, where the header includes size of the image ensemble, size of each data block, and a vector having a dimension corresponding to the number of data blocks and each value of the vector is a number of rank-one tensors used to represent the corresponding data block in the plurality of data blocks.

11. The method of claim 1 further comprises randomly accessing a given image from the image ensemble.

12. The method of claim 11 further comprises decoding the given image as follows:

$$IMAGE_{i,j} = \Sigma_{r=1}^{Rj}(B_{j,r}^{(1)} \circ B_{j,r}^{(2)})B_{i,j,r}^{(3)}$$

where $\circ$ is an outer product; j is the block index; $R_j$ is the number of rank-one tensors, $B_{j,r}^{(d)}$, d=1,2 is a vector, and $B_{i,j,r}^{(3)}$, is a single value from row i of matrix $B^{(3)}$.

13. A computer-implemented method for compressing a collection of multi-dimensional data, comprising:

receiving, by a decomposer, multi-dimensional data for an ensemble composed of a plurality of multi-dimensional data entities;

dividing, by the decomposer, the multi-dimensional data into a plurality of data blocks, each of the data blocks having n dimensions, where n≥3;

decomposing, by the decomposer, each data block from the plurality of data blocks into a set of rank-one tensors by estimating each rank-one tensor individually, where each rank-one tensor is represented by n one-dimensional vectors;

concatenating, by the decomposer, the n one-dimensional vectors to form one composite vector for each of the plurality of data blocks and then arranging the composite vectors into a two dimensional data, where the decomposer is implemented by computer processor;

compressing the two-dimensional data using a compression operation; and storing the compressed two-dimensional in a non-transitory data store.

14. A computer-implemented method for compressing a collection of images, comprising:

receiving, by a decomposer, image data for an image ensemble composed of a plurality of images;

dividing, by the decomposer, the image data into a plurality of data blocks, each of the data blocks having three dimensions;

decomposing, by the decomposer, each data block from the plurality of data blocks into a set of rank-one tensors by
  (a) representing each data block with a rank-one tensor;
  (b) for each block, estimate error reduction when an additional rank-one tensor is used;
  (c) find a given data block with maximum error reduction;
  (d) estimate a corresponding data block for the given data block using an additional tensor; and
  (e) repeating steps (c) and (d) until an average error for the data blocks is below a threshold or a total number of rank-one tensors is larger than a maximum allowable value;

arranging, by the decomposer, the rank-one tensors for each of the plurality of data blocks into a two-dimensional matrix, where the decomposer is implemented by computer processor;

compressing the two-dimensional matrix using a compression operation; and storing the compressed two-dimensional matrix in a non-transitory data store.

15. The method of claim 14 further comprises decomposing each data block into a rank-one tensor represented as an outerproduct of three vectors as follows $$\hat{\chi}_j = \Sigma_{r=1}^{Rj} \lambda_{j,r} (b_{j,r}^{(1)} \circ b_{j,r}^{(2)} \circ b_{j,r}^{(3)})$$

where $\circ$ is an outer product; j is the block index; $R_j$ is the number of rank-one tensors and $\lambda_{j,r}$ is a normalization value.

16. The method of claim 15 further comprises computing $b_{j,r}^{(d)}$ using an alternative least square method.

17. The method of claim 15 wherein arranging the rank-one tensors by placing $b_{j,r}^{(1)}$ at the top of the matrix, placing $b_{j,r}^{(3)}$ at the bottom of the matrix, and placing $b_{j,r}^{(2)}$ below $b_{j,r}^{(1)}$ in the matrix and above $b_{j,r}^{(3)}$ in the matrix.

18. The method of claim 17 wherein arranging the rank-one tensors further comprises separating rank-one tensors with a rank index of one from the remainder of the rank-one tensors and placing the rank-one tensors with a rank index of one on the left of the matrix.

19. The method of claim 18 wherein arranging the rank-one tensor further comprises placing the rank-one tensor with a rank greater than one according to the blocks they belong to in a raster-scan order.

20. The method of claim 14 further comprises compressing the two-dimensional matrix using JPEG 2000 operation.

21. The method of claim 14 further comprises storing the compressed twodimensional matrix with a header, where the header includes size of the image ensemble, size of each data block, and a vector having a dimension corresponding to the number of data blocks and each value of the vector is a number of rank-one tensors used to represent the corresponding data block in the plurality of data blocks.

\* \* \* \* \*

UNITED STATES PATENT AND TRADEMARK OFFICE
CERTIFICATE OF CORRECTION

PATENT NO. : 9,681,147 B2
APPLICATION NO. : 14/599797
DATED : June 13, 2017
INVENTOR(S) : Abo Mahfoodh et al.

It is certified that error appears in the above-identified patent and that said Letters Patent is hereby corrected as shown below:

In the Specification

Column 5, Line 35, "r=1,2and" should be --r=1,2 and--.

Column 5, Line 60, "$B^{(3)}$)." should be --$B^{(3)}$.--.

Column 5, Line 65, "16×16>64" should be --16×16×64--.

In the Claims

Column 9, Line 60, "twodimensional" should be --two-dimensional--.

Column 11, Line 17, "twodimensional" should be --two-dimensional--.

Signed and Sealed this
Nineteenth Day of December, 2017

Joseph Matal
*Performing the Functions and Duties of the
Under Secretary of Commerce for Intellectual Property and
Director of the United States Patent and Trademark Office*